United States Patent [19]

Torii et al.

[11] Patent Number: 5,147,494
[45] Date of Patent: Sep. 15, 1992

[54] SEAL DEVICE FOR TIRE PRESSURE-ADJUSTING DEVICE

[75] Inventors: Shuji Torii; Hiromichi Nozaki, both of Yokohama; Kazuyuki Aoshima, Fujisawa; Norimasa Matsui, Kawasaki, all of Japan

[73] Assignees: Keeper Co., Ltd., Tokyo; Nissan Motor Co., Ltd., Yokohama, both of Japan

[21] Appl. No.: 558,444

[22] Filed: Jul. 27, 1990

[30] Foreign Application Priority Data

Jul. 28, 1989 [JP] Japan .................. 1-88025[U]

[51] Int. Cl.$^5$ .................. B60C 23/00; F16K 41/08
[52] U.S. Cl. .................. 156/417; 277/63; 277/77; 277/153; 277/28
[58] Field of Search .................. 152/417; 137/224; 277/59, 63, 70, 77, 153, 28

[56] References Cited

U.S. PATENT DOCUMENTS

| | | | |
|---|---|---|---|
| 2,856,209 | 10/1958 | Watson | 277/28 |
| 3,070,410 | 12/1962 | Derks | 277/28 X |
| 3,198,529 | 8/1965 | Voitik | 277/28 |
| 3,540,741 | 11/1970 | Le Febvre | 277/28 |
| 3,544,116 | 12/1970 | Peterson | 277/28 X |
| 3,811,687 | 5/1974 | Honold et al. | 277/28 |
| 3,847,453 | 11/1974 | Herbert | 277/59 |
| 4,434,833 | 3/1984 | Swanson et al. | 152/417 |
| 4,733,707 | 3/1988 | Goodell et al. | 152/417 |
| 4,838,559 | 6/1989 | Guardini et al. | 277/28 X |
| 4,895,394 | 1/1990 | Delamare | 277/28 X |

FOREIGN PATENT DOCUMENTS

| | | |
|---|---|---|
| 0224674 | 6/1987 | European Pat. Off. |
| 0308256 | 3/1989 | European Pat. Off. |
| 2854772 | 7/1980 | Fed. Rep. of Germany |
| 62-151104 | 9/1987 | Japan |
| 249210 | 1/1970 | U.S.S.R. .............. 152/417 |

Primary Examiner—Michael W. Ball
Assistant Examiner—Francis J. Lorin
Attorney, Agent, or Firm—Wegner, Cantor, Mueller & Player

[57] ABSTRACT

A seal device is adapted to be mounted at an area of relative rotation between two mounting portions of a tire pressure-adjusting device. The seal device includes a pair of first and second seal rings which are disposed in opposed relation to each other. Each of the first and second seal rings includes a main seal of an annular shape having a radially inwardly-directed lip formed on an inner periphery of the main seal, the lip having at its distal end a lip sliding surface to which a self-lubricating thin plate for sliding contact with one of the two mounting portion. Each seal ring further includes an auxiliary seal of an annular shape having a radially inwardly-directed lip which is formed on an inner periphery of the auxiliary seal and is adapted for sliding contact with the one mounting portion, the auxiliary seal being connected to the main seal to form therebetween a closed space for holding grease. A valve is mounted on each of the auxiliary seals for effecting the intake and exhaust of air relative to the closed space.

8 Claims, 5 Drawing Sheets

SEAL DEVICE FOR TIRE PRESSURE-ADJUSTING DEVICE

BACKGROUND OF THE INVENTION

This invention relates to a seal device for use in a tire pressure-adjusting device for adjusting the pressure of a tire of an automobile from the driver's seat.

The inflation pressure of a tire of an automobile greatly influences not only safety, such as the braking and the steering, but also the life of the tire and the ride of the automobile. For this reason, recently, there has been developed a tire pressure-adjusting device for properly adjusting the tire pressure in accordance with the running condition from the room of the automobile.

In a conventional tire pressure-adjusting device, compressed air is supplied from an air supply source via an air pipe to an air passage in an axle case, and the compressed air is further fed from this air passage into the tire via an air passage, formed in the axle, and an air pipe. The axle case is not rotatable, and the axle is rotatable, and therefore in the supply of the air via the air passages, it is of absolute necessity to provide a seal device at the area of relative rotation between the axle case and the axle.

One such conventional seal device is disclosed, for example, in Japanese Utility Model Unexamined Publication No. 62-151104. As shown in FIG. 6, in this seal device, a seal-mounting portion 2 is formed in an inner surface of an axle case 1, and a pair of pressure-resistant oil seals 6 and 7 are provided at the seal-mounting portion 2 in opposed relation to each other, with a spacer 5 interposed between the oil seals 6 and 7. The spacer 5 has an air hole 4 in communication with an air hole 3 formed in the axle case 1. The oil seals 6 and 7 are fixed relative to the axle case 1 by a retainer ring 8. Distal ends 6a and 7a of lips of the oil seals 6 and 7 are pressed against an outer peripheral surface of an axle 9, and an air passage 10 formed in the axle 9 is open at one end to that portion of the outer peripheral surface of the axle 9 lying between the lip ends 6a and 7a. Therefore, compressed air supplied in a direction indicated by arrow A passes through the air hole 3 of the axle case 1 and the air hole 4 of the spacer 5, and is introduced into a closed or sealed space defined by the pair of oil seals 6 and 7, the spacer 5 and the axle 9. The compressed air is further fed from this sealed space to a tire via the air passage 10 of the axle 9 in a direction indicated by arrow B.

Each of the lip ends 6a and 7a of the oil seals 6 and 7 is in line-contact with the outer peripheral surface of the axle 9, and therefore this contact pressure is increased when supplying the compressed air, so that wear of the lip ends 6a and 7a is promoted. This results in a problem that the sealing properties of the seal device can not be maintained properly over a prolonged period of time. In addition, since the space defined by the pair of oil seals 6 and 7, the spacer 5 and the axle 9 is always in communication with the air holes 3 and 4 and the air passage 10, grease can not be sealed in this space. Thus, the only object to be sealed is the air, and therefore the air is liable to leakage, and besides because of inadequate lubrication, the lip ends 6a and 7a are subjected to premature wear, which also results in failure to properly maintain the sealing properties over a long period of time.

SUMMARY OF THE INVENTION

It is therefore an object of this invention to provide a seal device for a tire pressure-adjusting device which can lubricate lip ends of oil seals by grease, and can properly maintain the sealing properties over a prolonged period of time.

According to the present invention, there is provided a seal device for mounting between two mounting portions of a tire pressure-adjusting device rotatable relative to each other, the seal device comprising a pair of first and second seal rings which are disposed in opposed relation to each other, each of the first and second seal rings comprising:

(a) a main seal of an annular shape having a radially inwardly-directed lip formed on an inner periphery of the main seal, the lip having at its distal end a lip sliding surface having a gently-inclined portion and an abruptly-inclined portion extending continuously from the gently-inclined portion, the main seal having a self-lubricating thin plate which is secured to the lip sliding surface and is adapted for sliding contact with one of the two mounting portion;

(b) an auxiliary seal of an annular shape having a radially inwardly-directed lip which is formed on an inner periphery of the auxiliary seal and is adapted for sliding contact with the one mounting portion, the auxiliary seal being connected to the main seal to form therebetween a closed space for holding grease; and (c) valve means mounted on the auxiliary seal for effecting the intake and exhaust of air relative to the closed space.

In the seal device of this construction, the grease, sealed in the closed or sealed space, is urged by the air, fed into the closed space via an air passage, to press the distal end of the lip of the main seal against the mating mounting portion, and also this grease lubricates the distal ends of the lips of the main and auxiliary seals. When the compressed air is introduced into the closed space, the distal end of the lip of the main seal is strongly pressed against the mating mounting portion, so that the lip is flexed. As a result, the self-lubricating thin plate is brought into face-to-face contact with the mating mounting portion, thereby preventing unnecessary wear of the lip distal end.

DESCRIPTION OF THE PREFERRED EMBODIMENTS

Figure 1:
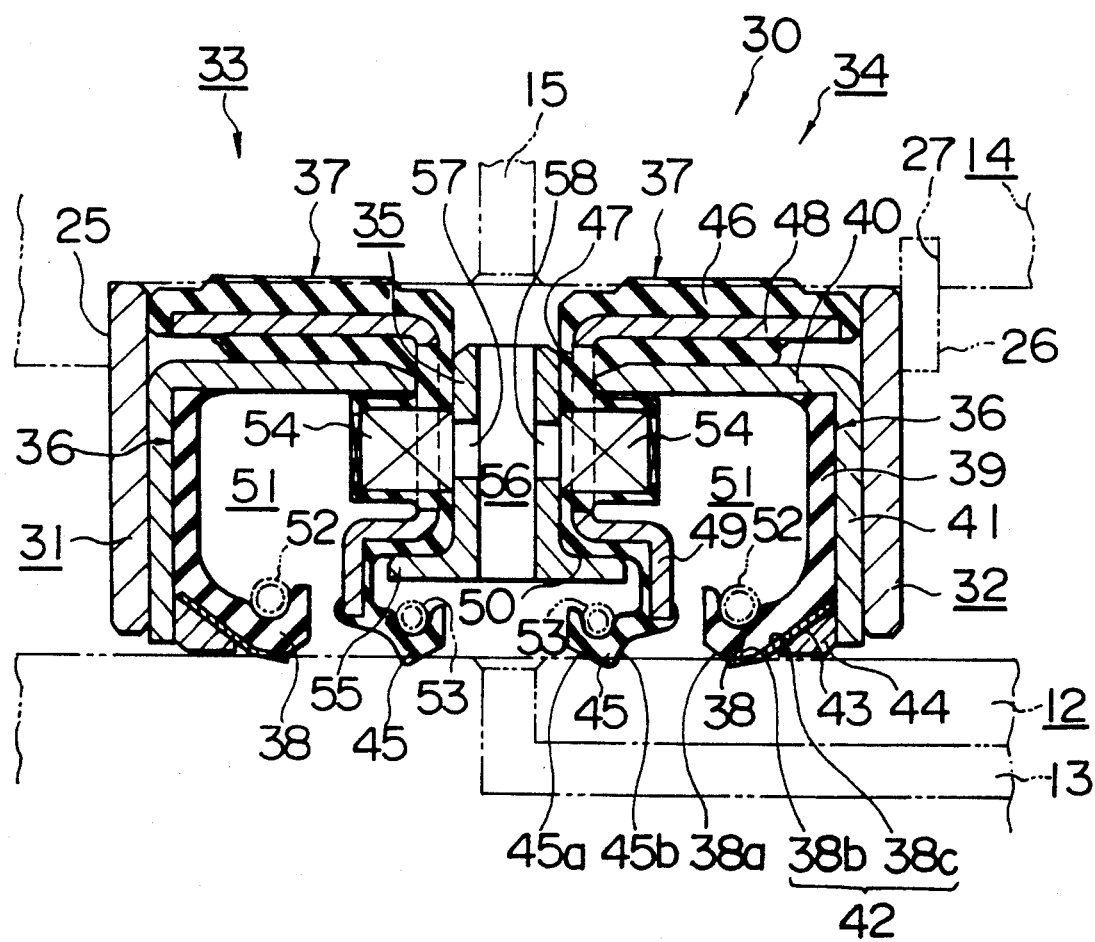
FIG. 1 is a cross-sectional view of a portion of a seal device of the present invention for use in a tire pressure-adjusting device.

The invention will now be described with reference to the drawings. First, a tire pressure-adjusting device employing a seal device according to the present invention will be described briefly with reference to FIG. 4. An air pipe 11 connected to an air supply source is connected to one end of an air passage 13 formed in a wall of an axle case 12. The other end of the air passage 13 is connected via the seal device 30 to one end of an air passage 15 formed in a hub 14. The other end of the air passage 15 is connected to one end of an air pipe 16, and the other end of the air pipe 16 is open to the interior of a tire 17. An axle 18 is rotatably received in the axle case 12, and the hub 14 is fixedly secured to the axle 18 by bolts 19. The tire 17 is fixed via a wheel disk 20 to the hub 14 by hub nuts 21. An outer bearing 22 and an inner bearing 23 are interposed between the inner peripheral surface of the hub 14 and the outer peripheral surface of the axle case 12. The rotation of the axle 18 relative to the non-rotatable axle case 12 is transmitted to the tire 17 via the hub 14 and the wheel disk 20, and the hub 14 is rotated relative to the axle case 12. Reference numeral 24 denotes a brake drum.

The seal device 30 is fixedly secured to the inner peripheral surface of the hub 14 for rotation with the hub 14. Therefore, the seal device 30 is in sliding contact with the outer peripheral surface of the axle case 12, and for this reason a high air-tightness and high lubricating properties are required for the seal device 30.

FIG. 1 shows details of the seal device 30. The seal device 30 is of a ring-shape, and therefore the cross-section of the seal device 30 in its axial direction is symmetrical with respect to the axis thereof. FIG. 1 shows an upper portion of such symmetrical cross-section.

An end plate 31 on one side of the seal device 30 is mated with a seal device-mounting step portion 25 formed on the inner peripheral surface of the hub 14, and a retainer ring 26 is fitted in a retainer groove 27, formed in the inner peripheral surface of the hub 14, in abutting relation to another end plate 32 on the other side of seal device 30. In this manner, the seal device 30 is fixed to the hub 14.

The seal device 30 includes two seal rings 33 and 34 connected together through one spacer ring 35 interposed therebetween, The two seal rings 33 and 34 are of an identical configuration, and are arranged in reversed relation to each other in a right-and-left direction, and therefore only one seal ring, that is, the seal ring 34, will now be described. When referring to the axial direction, that side directed toward the spacer ring 35 is referred to as "inner side" whereas the opposite side directed away from the spacer ring 35 is referred to as "outer side".

The seal ring 34 comprises a main seal 36 and an auxiliary seal 37. The main seal 36 made, for example, of fluororubber, has a lip 38 directed radially inwardly, and an extension portion 39 directed radially outwardly. A reinforcement ring 41 of metal is fixedly secured to the axial outer side of the extension portion 39, the reinforcement ring 41 having an outer peripheral flange 40 directed axially inwardly. The distal end of the lip 38 of the main seal 36 has an inclined portion 38a directed generally axially inwardly and a gently-inclined portion 38b directed generally axially outwardly. An abruptly-inclined portion 38c extends generally axially outwardly from the gently-inclined portion 38b, and the gently-inclined portion 38b and the abruptly-inclined portion 38c cooperate with each other to provide a lip sliding surface 42. A thin plate 43 with self-lubricating properties, made for example of a tetrafluoroethylene resin, is secured or bonded to the lip sliding surface 42. A back-up ring 44 of a resin is mounted in an annular space of a triangular cross-section formed between the thin plate 43 and the reinforcement ring 41.

The auxiliary seal 37 made of acrylic rubber has a lip 45 directed radially inwardly, and an extension portion 47 directed radially outwardly, the extension portion 47 having an outer peripheral flange 46 directed axially outwardly. A reinforcement ring 49 of metal is molded integrally with the extension portion 47 by insert-molding. The reinforcement ring 49 has a flange 48 embedded in the flange 46 of the extension portion 47. The distal end of the lip 45 has an inclined portion 45a directed generally axially inwardly, and an inclined portion 45b directed generally axially outwardly. The extension portion 47 and the reinforcement ring 49 are recessed axially outwardly adjacent to the lip 45 to provide a recessed step portion 50.

The main seal 36 is attached to the auxiliary seal 37 by press-fitting the flange 40 of the reinforcement ring 41 in the inner peripheral surface of the flange 46 of the auxiliary seal 37, so that a sealed or closed space 51 for holding grease is formed between the main and auxiliary seals 36 and 37. The lips 38 and 45 are urged radially inwardly by garter springs 52 and 53, respectively. An intake valve of the slit type (check valve) 54 is provided at the extension portion 47 of the auxiliary seal 37 so as to introduce air into the sealed space 51. In this embodiment, the lip 45 of the auxiliary seal 37 also serves as an exhaust valve for discharging the air from the sealed space 51.

When the seal ring 34 comprising the main seal 36 and the auxiliary seal 37 is reversed in the axial direction, this seal ring can be used as the other seal ring 33. The two seal rings 33 and 34 are connected together through the spacer ring 35 interposed therebetween. The spacer ring 35 of metal has an inner peripheral flange 55 extending axially in opposite directions, and the recessed step portions 50 and 50 of the auxiliary seals 37 and 37 of the two seal rings 33 and 34 are press-fitted on the flange 55, thereby integrally connecting the two seal rings 33 and 34 to the spacer ring 35. The spacer ring 35 has a plurality of air holes 56 spaced from one another in the circumferential direction of the spacer ring 35, each of the air holes 56 extending radially through the spacer ring 35. A pair of annular grooves 57 and 58 communicating with these air holes 56 are formed respectively in the opposite sides or faces of the spacer ring 35. The annular grooves 57 and 58 communicate respectively with the intake valves 54 and 54 of the seal rings 33 and 34. With this construction, when the seal rings 33 and 34 are attached to the spacer ring 35, the intake valves 54 and 54 are positively communicated with the air holes 56 via the respective annular grooves 57 and 58 regardless of the position of the intake valves 54 and 54.

In the seal ring assembly thus assembled, grease is filled in each of the sealed spaces 51 and 51, and thereafter the end plates 31 and 32 are mated respectively with the opposite sides of this seal ring assembly. Then, the seal ring assembly is positioned relative to the seal device-mounting step portion 25, formed in the inner peripheral surface of the hub 14, by means of the end plate 31, and the retainer ring 26 is fitted in the retainer groove 27, formed in the inner peripheral surface of the hub 14 in such a manner that the retainer ring 26 is held against the other end plate 32. In this manner, the seal ring assembly is fixed to the hub 14. Then, the inner periphery of the seal ring assembly is fitted on the outer periphery of the axle case 12, so that the distal ends of the lips 38 and 45 are pressed into line-contact with the outer peripheral surface of the axle case 12. As a result, that region disposed radially outwardly of the spacer ring 35 is closed or sealed by the two auxiliary seals 37 and the hub 14, and is in communication with the air passage 15 of the hub 14. Also, that region disposed radially inwardly of the spacer ring 35 is closed or sealed by the two lips 45 and the axle case 12, and is in communication with the air passage 13 of the axle case 12. Each of the two sealed spaces 51 filled with the grease is sealed by the two lips 38 and 45 and the axle case 12.

Figure 4:
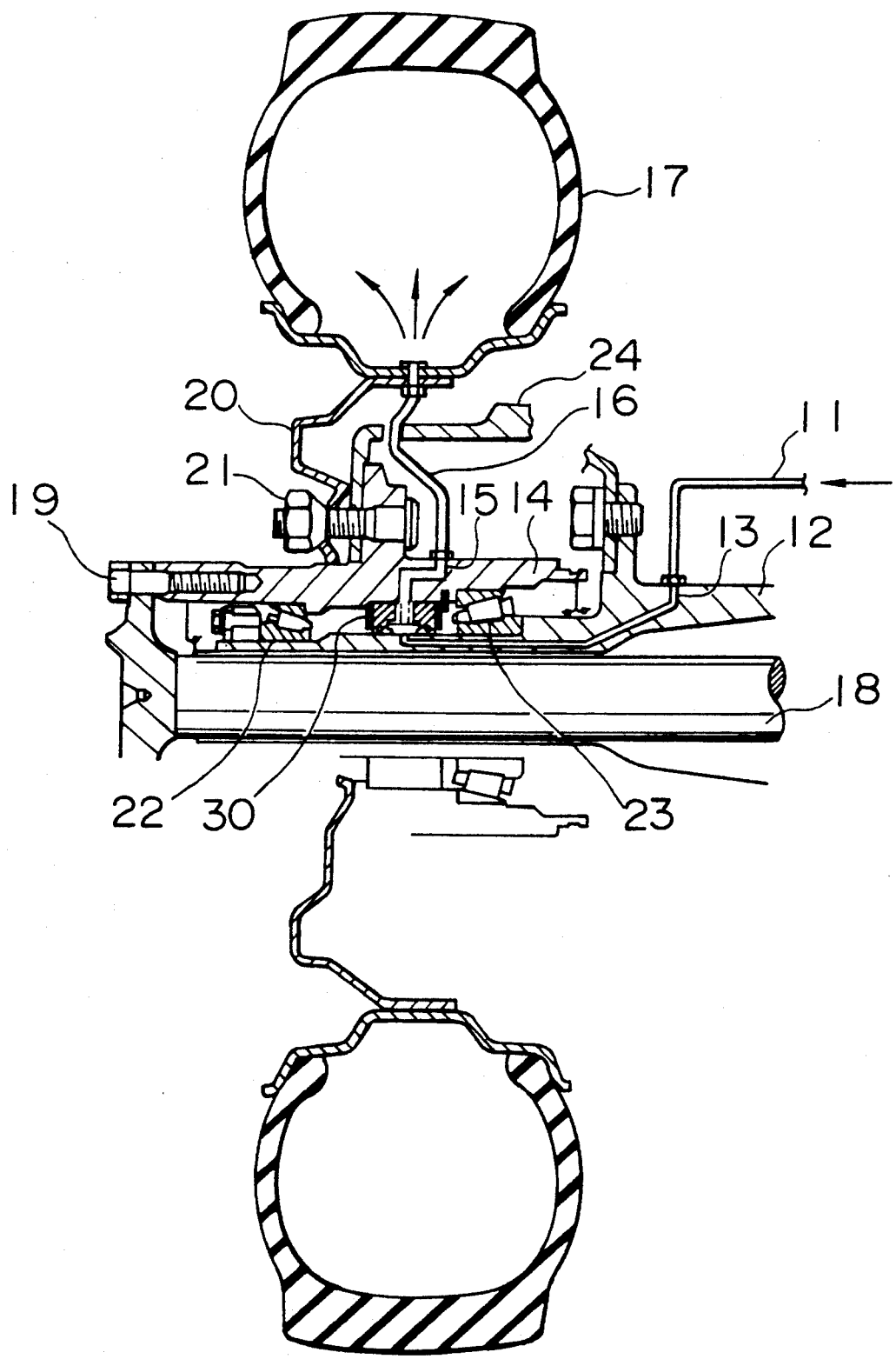
FIG. 4 is a cross-sectional view of a portion of the tire pressure-adjusting device incorporating the seal device of the present invention.

The operation of the seal device of the above construction will now be described. When the tire pressure is to be increased, compressed air is supplied via the air passage 13 of the axle case 12. This compressed air passes through the air holes 56 in the spacer ring 35, the air passage 15 in the hub 14, and the air pipe 16, and is supplied to the interior of the tire 17, as shown in FIG. 4. Part of the compressed air flowing through the air holes 56 of the spacer ring 35 is introduced into each of the sealed spaces 51 via the corresponding intake valve 54, and the thus introduced compressed air urges the distal end of the lip 38 of each main seal 36 against the outer peripheral surface of the axle case 12 through the grease filled in the sealed space 51. As a result, the lip 38 is flexed, so that the self-lubricating thin plate 43 secured to the sliding surface 42 is brought into face-to-face contact with the outer peripheral surface of the axle case 12, thereby decreasing the surface pressure. This also avoids unnecessary wear of the distal end of the lip 38, and prevents leakage of the air from the distal end of the lip 38. Also, the grease urged by the compressed air is interposed between the distal end of the lip 38 and the outer peripheral surface of the axle case 12 and between the distal end of the lip 45 and the outer peripheral surface of the axle case 12, thereby lubricating these portions to avoid wear of the distal ends of the lips 38 and 45. On the other hand, when the compressed air is discharged from the tire via the air passage 15, the air holes 56 and the air passage 13 so as to decrease the tire pressure, the high-pressure air in each sealed space 51 is discharged toward the spacer ring 35 through the distal end of the lip 45 serving as the exhaust valve, and the pressure inside the sealed space 51 and the pressure outside the sealed space 51 are in an equilibrium at a lower pressure level equal to the pressure in the tire. As a result, the lip 38 of the main seal 36 is returned into the original line-contact condition, so that the overload on the lip 38 is relieved, and the leakage of the air through the distal end of the lip 38 is prevented.

Figure 2:
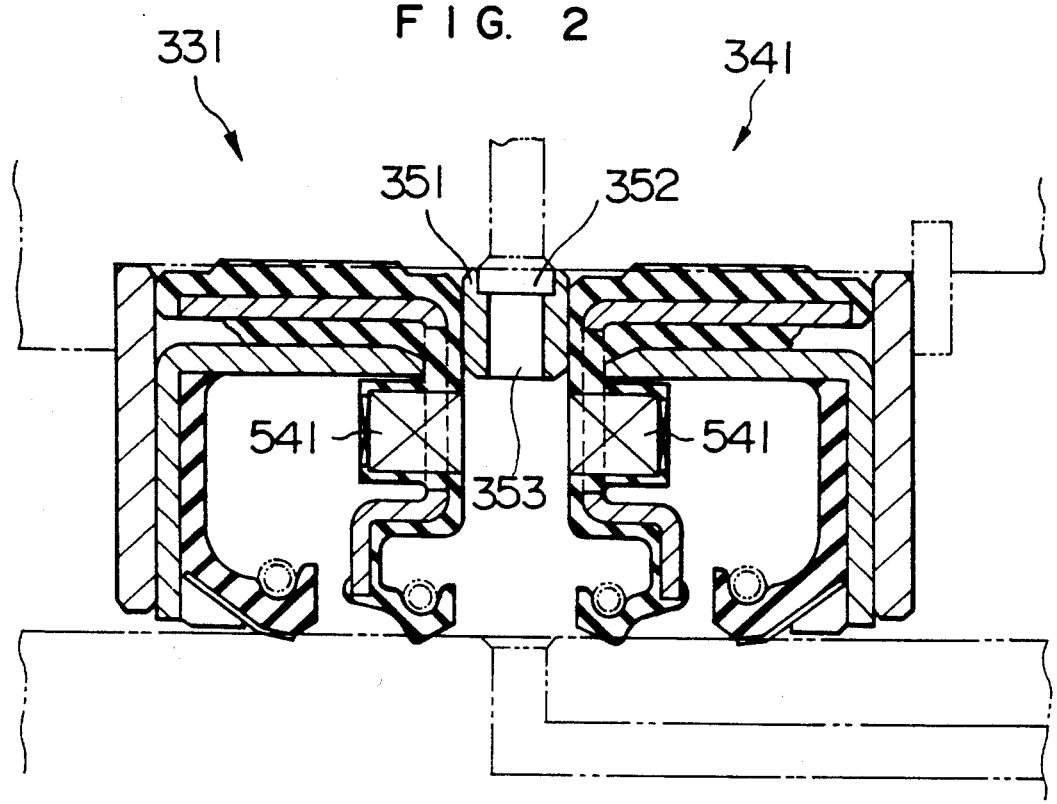
FIGS. 2 and 3 are views similar to FIG. 1, but showing modified seal devices of the invention, respectively.

FIG. 2 shows a modified seal device of the invention. This embodiment differs from the preceding embodiment in that a spacer ring 351 is disposed radially outwardly of intake valves 541, and that an annular groove 352 is formed in an outer peripheral surface of the spacer ring 351, and that one or more air passages 353 extend radially through the spacer ring 351. In the case where the plurality of air passages 353 are provided, they are spaced from one another circumferentially of the spacer ring 351. Connection of two seal rings 331 and 341 to the seal ring 351 is made by a known fastening means, such as a projection-and-groove arrangement, an adhesive or the like. This embodiment is advantageous in that the spacer ring 351 is small in size and is lightweight, and can be simplified in configuration.

Figure 3:
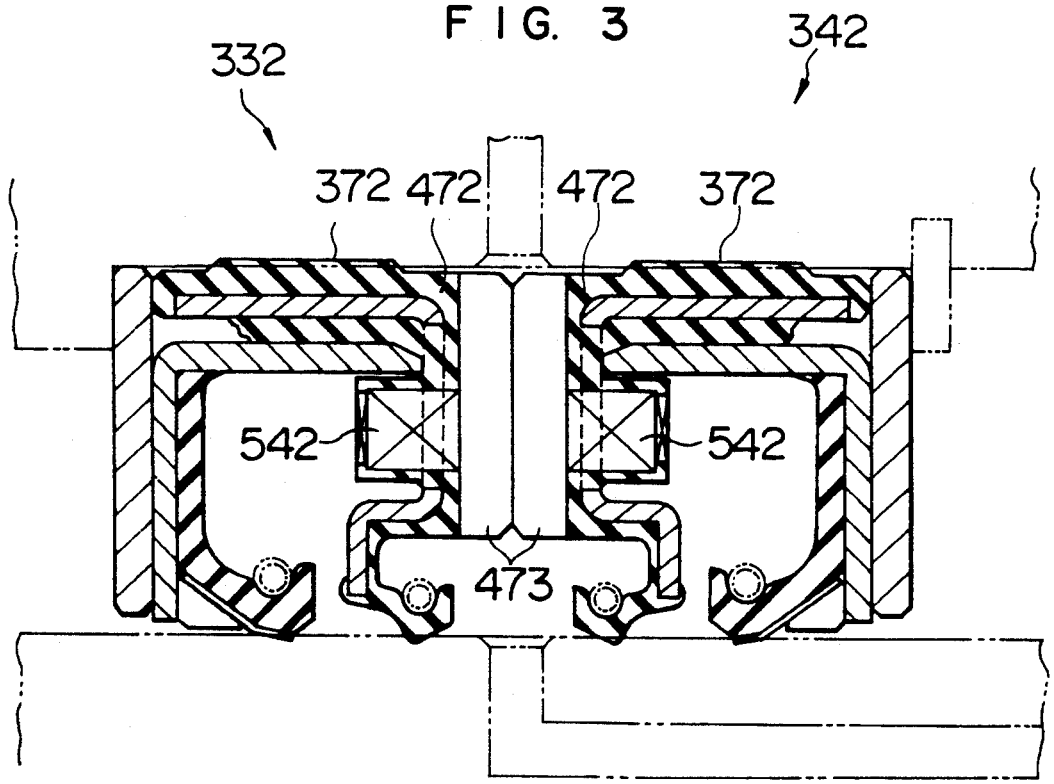

FIG. 3 shows another modified seal device of the invention. In this embodiment, opposed extension portions 472 of auxiliary seals 372 of two seal rings 332 and 342 are thickened, and are held against each other, and one or more radially-extending grooves 473 are formed in each of the mated sides of the extension portions 472. In the case where the plurality of grooves 473 are provided, they are spaced from one another circumferentially of the extension portion 472, and at least one of the groove 473 in each extension portion 472 must be opposed to a corresponding intake valve 542. The auxiliary seals 372 of the two seal rings 332 and 342 are connected together by a known fastening means, such as a projection-and-groove arrangement, an adhesive or the like. This embodiment obviates the need for a spacer ring, and therefore the number of the component parts, as well as the time and labor required for assembling the seal device, is reduced. This advantageously simplifies the construction, and reduces the cost.

In the embodiment of FIG. 1, although the main seal 36 is fitted radially inwardly of the auxiliary seal 37, the seal device may be so modified that the auxiliary seal 37 is fitted radially inwardly of the main seal 36. Also, the reinforcement seal 41 of the main seal 36 may be made of a resin, and may be formed integrally with the back-up ring 44. Further, although the lip 45 of the auxiliary seal 37 also serves as the exhaust valve, the intake valve 54 may be a bi-directional valve for performing intake and exhaust functions. In this case, the lip 45 for retaining the grease can be of a double-lip construction, thereby further enhancing the sealability against the grease and air within the sealed space 51. Further, as the valve means for taking the air into and out of the sealed space 51, any other suitable valve than the slit-type valve may be used, and examples of such valves are of the poppet type, the ball type, the needle type and the spool type.

These modifications are also applicable to the embodiments of FIGS. 2 and 3, and other various modifications of the invention can also be made.

Figure 5:
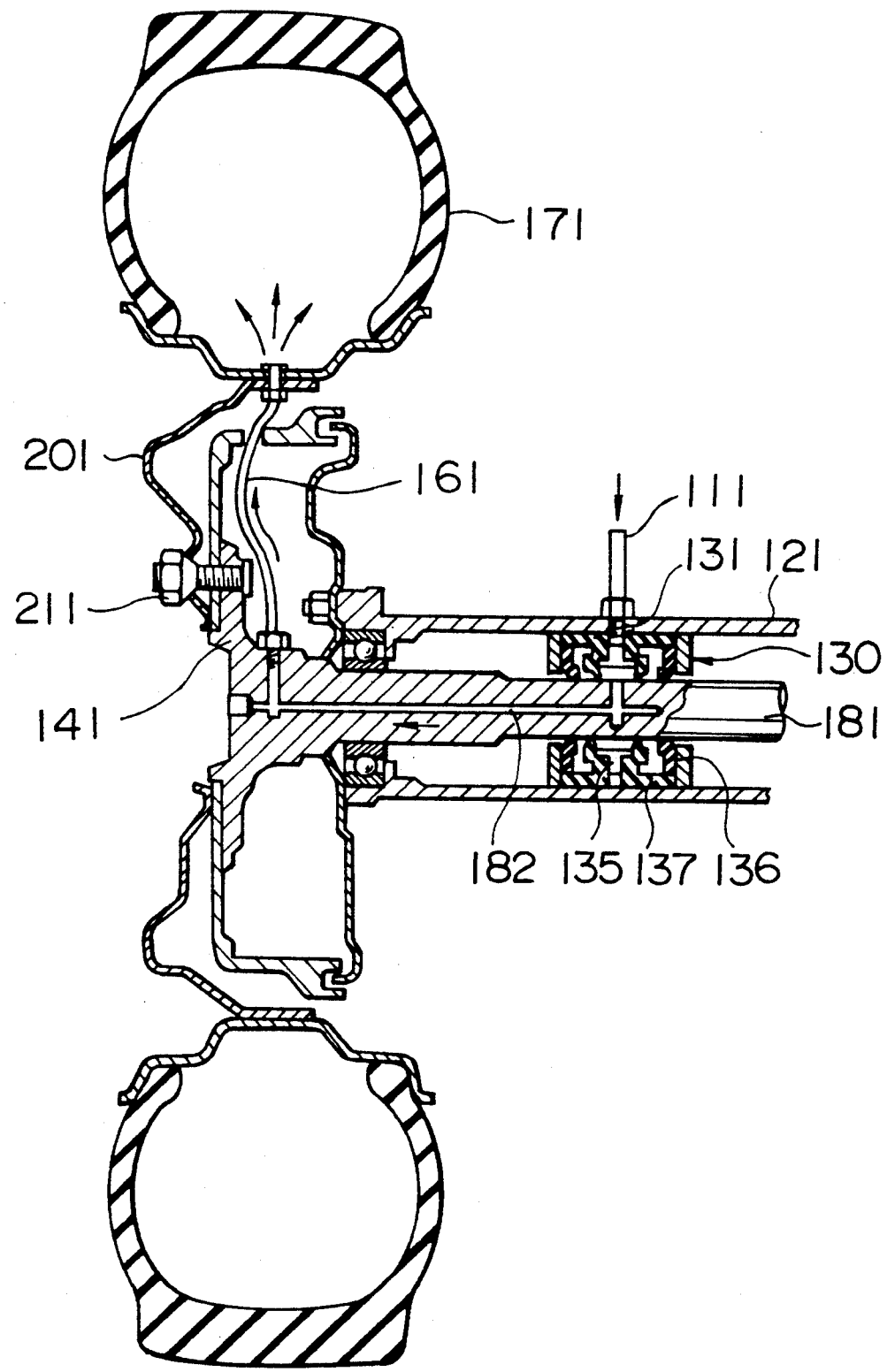
FIG. 5 is a view similar to FIG. 4, but showing a modified tire pressure-adjusting device.
Figure 6:
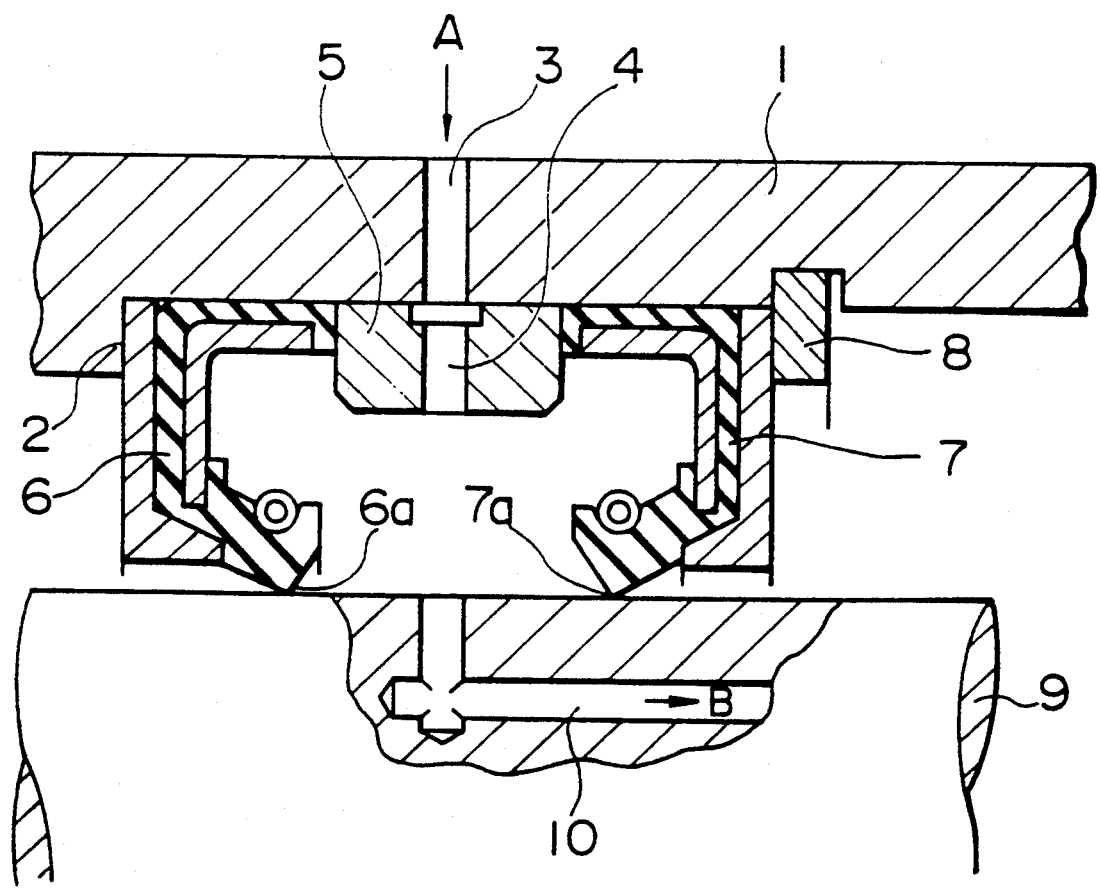
FIG. 6 is a cross-sectional view of a portion of a conventional seal device for a tire pressure-adjusting device.

FIG. 5 shows an example in which a seal device 130 similar to the seal device of FIG. 1 is applied to another type of tire pressure-adjusting device. The seal device 130 is fixedly secured to an inner peripheral surface of an axle case 121, and lip distal ends of each main seal 136 and each auxiliary seal 137 are held in contact with an outer peripheral surface of an axle 181. An air passage 182 is formed in the axle 181. A hub 141 is formed integrally on one end of the axle 181. The hub 141 is fixedly secured to a disk wheel 201 by hub nuts 211. An air hole 131 is formed in the axle case 121, and is opposed to a spacer ring 135 of the seal device 130. The spacer ring 135 is opposed to one end of the air passage 182 formed in the axle 181.

Compressed air, supplied from an air pipe 111 connected to the air hole 131, passes through the seal device 130, and is supplied into a tire 171 via the air passage 182 of the axle 181 and an air pipe 161.

In the above embodiments, although the two seal rings are connected together integrally, the seal rings may be premolded as an unitary construction.

As described above, in the seal devices for the tire pressure-adjusting device, the grease-filling sealed space is formed between the combined main and auxiliary seals of each seal ring, the main and auxiliary seals having the respective lip distal directed radially inwardly. The valve means is provided on the auxiliary seal for effecting the intake and exhaust of the air relative to the sealed space formed between the main and auxiliary seals. The lip distal end of the main seal has the lip sliding surface defined by the gently-inclined portion and the abruptly-inclined portion extending continuously therefrom. The self-lubricating thin plate is secured to the lip sliding surface. With this construction, when applying the compressed air to the tire, the compressed air is introduced into the sealed space via the valve means, and urges the lip of the main seal through the grease filled in the sealed space. As a result, the lip is flexed, so that the self-lubricating thin plate secured to the sliding surface is brought into contact with the mating member to reduce the surface pressure. Therefore, unnecessary ear of the lip distal portion is avoided, and the sealing properties of the seal device can be properly maintained over an prolonged period of time. Also, since the grease in the sealed space is urged by the compressed air, so that the lip distal end holds the grease, and therefore the wear due to insufficient lubrication is prevented, thus positively maintaining the sealing properties of the seal device over a long period of time.

What is claimed is:

1. In a central tire inflation system, a rotary seal device, said seal device comprising a pair of first and second seal rings which are disposed in opposed relation to each other and having an air passage therebetween, each of said first and second seal rings comprising:
   (a) a main seal of an annular shape having a radially inwardly-directed lip formed on an inner periphery of said main seal, said lip having at its distal end a lip sliding surface having a gently-inclined portion and an abruptly-inclined portion extending continuously from said gently-inclined portion axially outwardly, said main seal having a self-lubricating thin plate which is secured to said lip sliding surface and is adapted for sliding contact;
   (b) an auxiliary seal of an annular shape having a radially inwardly-directed lip which is formed on an inner periphery of said auxiliary seal and is adapted for sliding contact, said auxiliary seal being connected to said main seal to form therebetween a closed space for holding grease; and
   (c) valve means mounted on said auxiliary seal for effecting the intake and exhaust of air relative to said closed space such as to push grease towards said sliding surface with air from said central tire inflation system.

2. A seal device according to claim 1, in which said main seal includes a first extension portion extending radially outwardly from said lip of said main seal, said auxiliary seal having a second extension portion extending radially outwardly from said lip of said auxiliary seal, and said second extension portions of said auxiliary seals of said pair of seal rings being disposed in opposed relation to each other.

3. A seal device according to claim 2, in which said main seal has a first reinforcement ring fixedly secured to said first extension portion, said first reinforcement ring having a flange extending axially from an outer periphery thereof, said auxiliary seal having a flange extending axially from an outer periphery of said second extension portion, said auxiliary seal having a second reinforcement ring fixedly secured thereto, and having a flange extending axially from an outer periphery of said second reinforcement ring, said flange of said first reinforcement ring being press-fitted in said flange of said auxiliary seal, and said flange of said second reinforcement ring being embedded in said flange of said auxiliary seal.

4. A seal device according to claim 2, in which said opposed second extension portions are held against each other, at least one radially-extending air passage groove being formed in each of said opposed second extension portions, said closed space being connected to said groove via said valve means.

5. A seal device according to claim 1, in which a spacer ring is interposed between said pair of first and second seal rings.

6. A seal device according to claim 2, in which a spacer ring is interposed between said opposed second extension portions of said auxiliary seals of said pair of first and second seal rings.

7. A seal device according to claim 6, in which said spacer ring is disposed radially outwardly of said valve means, said spacer ring having an annular groove formed in an outer periphery thereof, and at least one air hole extending radially through said spacer ring, said annular groove communicating to each of said closed spaces of said pair of first and second seal rings via said at least one air hole, a space formed between said opposed second extension portions and disposed radially inwardly of said spacer ring, and a respective one of said valve means.

8. A seal device according to claim 6, in which said spacer ring extends radially inwardly of said valve means, said spacer ring having a pair of annular grooves formed respectively in opposite sides thereof, and at least one air hole extending radially through said spacer ring and communicating with said pair of annular grooves, said annular grooves communicating respectively with said closed spaces of said pair of first and second seal rings via respective valve means.

* * * * *